(12) United States Patent
Toffan et al.

(10) Patent No.: US 6,471,469 B2
(45) Date of Patent: Oct. 29, 2002

(54) METHODS AND APPARATUS FOR SEALING GAS TURBINE ENGINE VARIABLE NOZZLES

(75) Inventors: Michael Jay Toffan, Mason, OH (US); Paul Evan Zimpelmann, Cincinnati, OH (US); David Jay Harris, Fairfield, OH (US)

(73) Assignee: General Electric Company, Schenectady, NY (US)

( * ) Notice: Subject to any disclaimer, the term of this patent is extended or adjusted under 35 U.S.C. 154(b) by 205 days.

(21) Appl. No.: 09/728,030

(22) Filed: Nov. 30, 2000

(65) Prior Publication Data

US 2002/0064455 A1 May 30, 2002

(51) Int. Cl.[7] ............................ F01D 17/16; F01D 11/00
(52) U.S. Cl. ........................ 415/160; 415/230; 29/888.3
(58) Field of Search ................................ 415/160, 230; 60/771, 770; 239/265.11; 29/888.3

(56) References Cited

U.S. PATENT DOCUMENTS

| | | | |
|---|---|---|---|
| 4,292,802 A | 10/1981 | Snow | |
| 5,054,997 A | 10/1991 | Corsmeier et al. | |
| 5,307,624 A | 5/1994 | Even-Nur et al. | |
| 5,437,411 A | 8/1995 | Renggli | |

*Primary Examiner*—Edward K. Look
*Assistant Examiner*—Kimya N McCoy
(74) *Attorney, Agent, or Firm*—Rodney M. Young; Armstrong Teasdale LLP

(57) ABSTRACT

A gas turbine engine variable geometry exhaust nozzle including a seal system that facilitates extending a useful life of the engine variable geometry system is described. The seal system includes a backbone and an attachment assembly. The attachment assembly frictionally engages the backbone to secure the attachment assembly to the backbone. The attachment assembly includes a plurality of clamp sub-assemblies and base sheet fabricated from a ceramic matrix composite material. The clamp sub-assemblies are clamped through openings extending through the base sheet, such that a predetermined amount of preload force is applied to the base sheet.

20 Claims, 4 Drawing Sheets

METHODS AND APPARATUS FOR SEALING GAS TURBINE ENGINE VARIABLE NOZZLES

BACKGROUND OF THE INVENTION

This invention relates generally to gas turbine engine variable geometry exhaust nozzles and, more particularly, to seal systems used to shield the gas turbine engine variable geometry systems.

At least some known gas turbine engines include an exhaust nozzle including a variable geometry system. The variable geometry system adjusts an area of the exhaust nozzle. Because the exhaust nozzles are subjected to high temperatures and thermal gradients as a result of hot combustion gases exiting the engine, the variable geometry systems include seal systems to shield components of the variable geometry system. Additionally, the seal systems form a portion of an exhaust flowpath through the engine.

At least some known seal systems include a backbone and a base sheet. The backbone secures the base sheet within the variable geometry system. To facilitate extending a useful life at high temperature operation, at least some known base sheets are fabricated from non-metallic materials, such as ceramic matrix composite (CMC) materials.

At least some known CMC base sheets are attached to the backbone using mechanical fasteners, such as rivets or bolts. Over time, continued thermal expansion may create local stress concentrations within the bolted and riveted joints. Furthermore, continued thermal cycling may loosen such mechanical fasteners.

Other known CMC base sheets are attached to the backbone with embedded attachments. Such attachments rely primarily on an interlaminar tensile strength of the CMC material to remain in place. Because such tensile strength may be a weakest load path through the base sheet, continued thermal cycling may loosen such embedded attachments and induce potentially damaging stresses into the base sheet.

BRIEF SUMMARY OF THE INVENTION

In an exemplary embodiment, a gas turbine engine exhaust nozzle includes a variable geometry system including a seal system that facilitates extending a useful life of the engine variable geometry system. The seal system includes a backbone and an attachment assembly. The attachment assembly frictionally engages the backbone to secure the attachment assembly to the backbone. The attachment assembly includes a plurality of clamp sub-assemblies and a non-metallic base sheet. The clamp sub-assemblies are clamped through openings extending through the base sheet, such that a predetermined amount of preload force is applied to the base sheet. In the exemplary embodiment, the base sheet is fabricated from a ceramic matrix composite material.

During operation, as high temperature combustion gases pass through the exhaust nozzle, the seal system shields components of the variable geometry system from the high temperatures, and the clamp sub-assemblies transfer downward seal loading to the backbone. Over time, as the seal system is exposed to high temperatures, the clamp sub-assemblies permit the attachment assembly to thermally expand axially without breaching sealing between the base sheet and the backbone. Furthermore, because the clamp sub-assemblies provide a margin for thermal and mechanical misalignments, the attachment assembly facilitates eliminating local stress risers in the seal system, thus facilitating extending the useful life of the seal system.

DETAILED DESCRIPTION OF THE INVENTION

Figure 1:
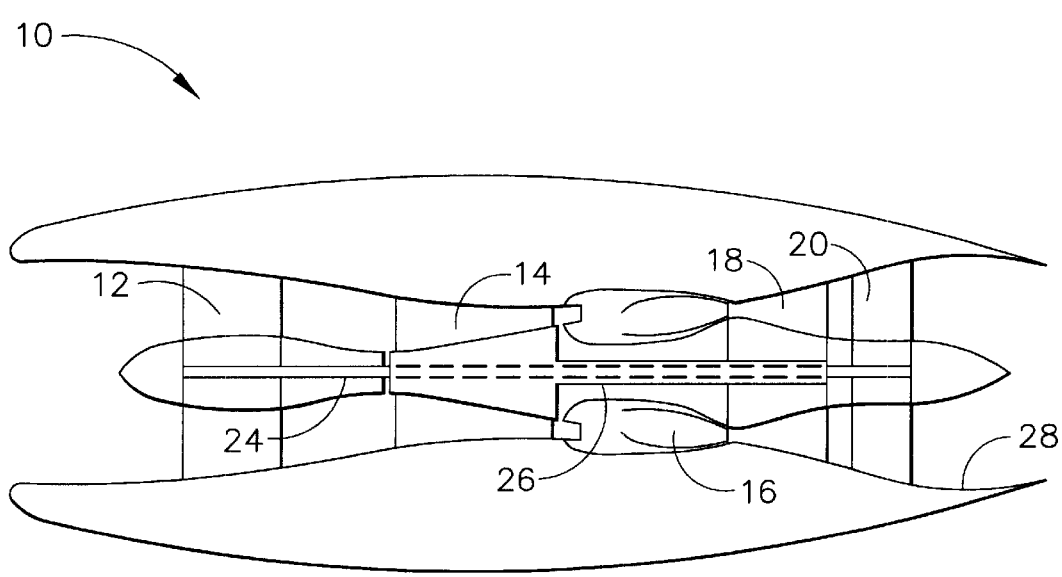
FIG. 1 is a schematic illustration of a gas turbine engine.

FIG. 1 is a schematic illustration of a gas turbine engine 10 including a fan assembly 12, a high pressure compressor 14, and a combustor 16. In one embodiment, engine 10 is a F414 engine commercially available from General Electric Company, Cincinnati, Ohio. Engine 10 also includes a high pressure turbine 18 and a low pressure turbine 20. Fan assembly 12 and turbine 20 are coupled by a first shaft 24, and compressor 14 and turbine 18 are coupled by a second shaft 26.

In operation, air flows through fan assembly 12 and compressed air is supplied from fan assembly 12 to high pressure compressor 14. The highly compressed air is delivered to combustor 16. Airflow from combustor 16 drives rotating turbines 18 and 20 and exits gas turbine engine 10 through an exhaust nozzle 28. Exhaust nozzle 28 includes a variable geometry system (not shown).

Figure 2:
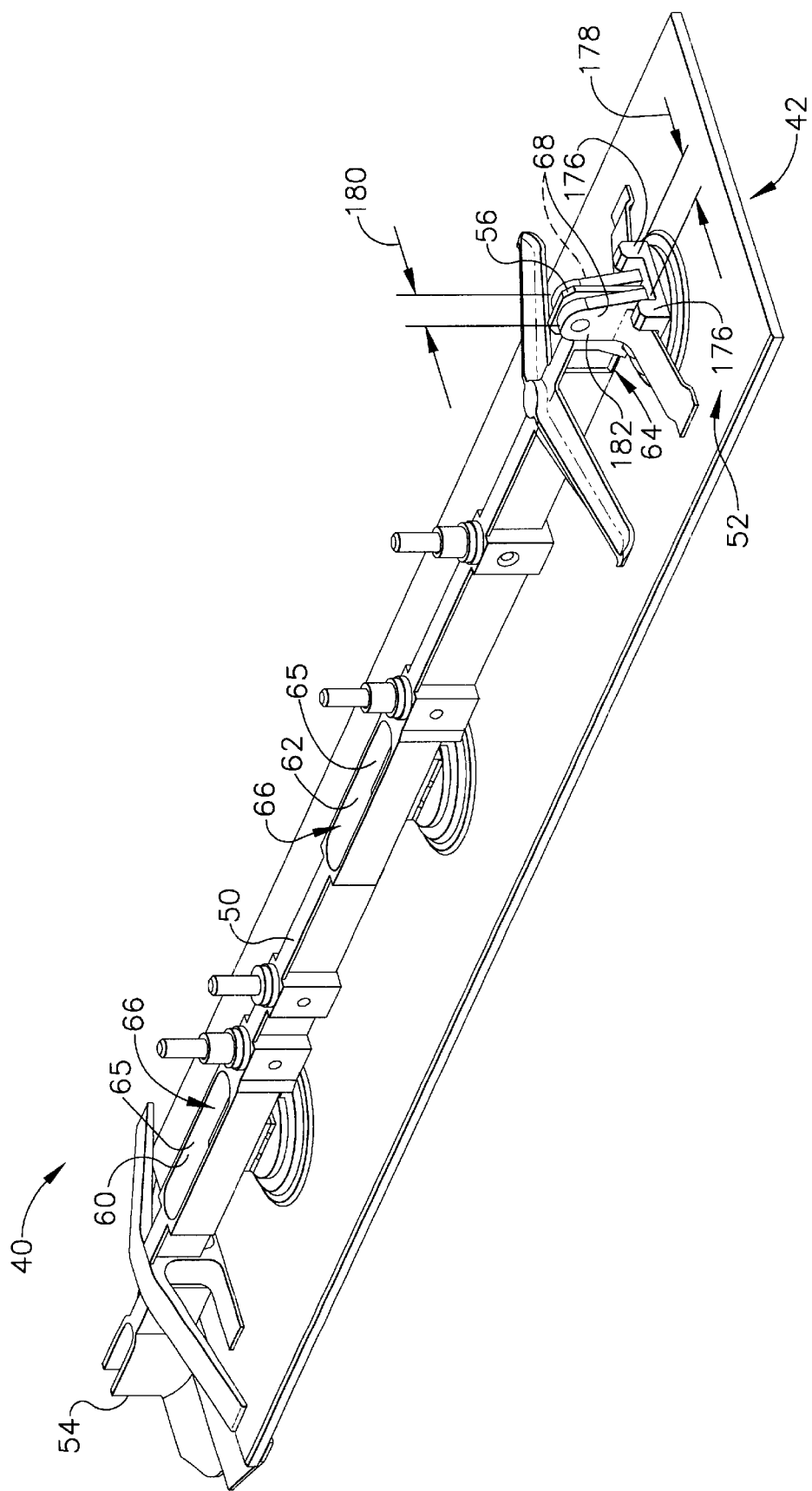
FIG. 2 is perspective view of a seal system used with the gas turbine engine shown in FIG. 1.
Figure 3:
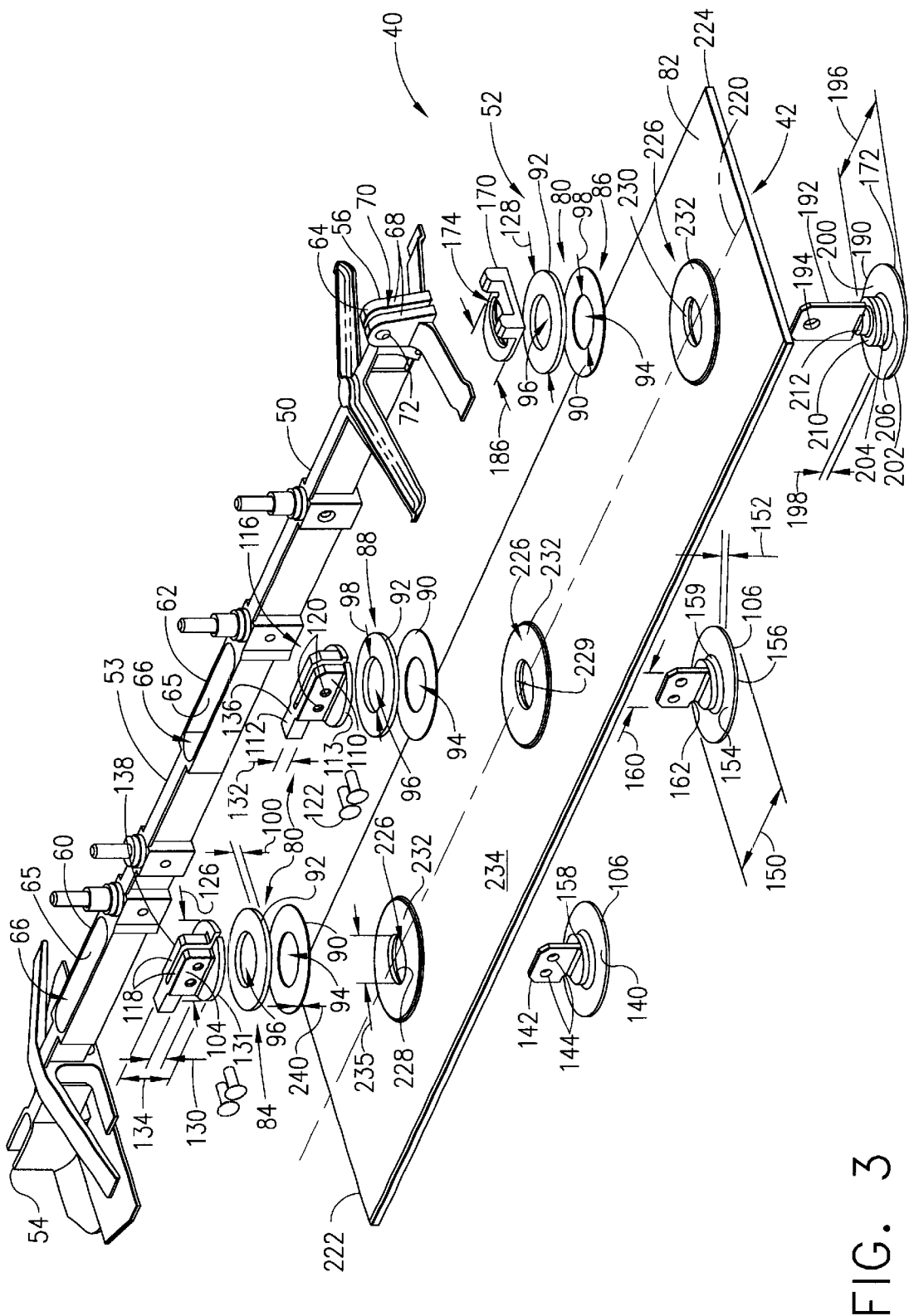
FIG. 3 is an exploded perspective view of the seal system shown in FIG. 2.

FIG. 2 is perspective view of a seal system 40 used with a gas turbine engine, such as gas turbine engine 10 (shown in FIG. 1). FIG. 3 is an exploded view of seal system 40. Seal system 40 is coupled to engine exhaust nozzle 28 (shown in FIG. 1). Engine exhaust nozzle 28 is a variable area exhaust nozzle that utilizes flap and seal variable geometry. Seal system 40 is coupled to exhaust nozzle 28 to shield variable geometry system components (not shown) from high temperature combustion gases exiting engine 10. More specifically, seal system 40 is coupled to exhaust nozzle 28 such that a flow path side 42 of seal system 40 is exposed to combustion gases exiting engine 10.

Seal system 40 includes a backbone 50 and an attachment assembly 52. Attachment assembly 52 is coupled to backbone 50 as described in more detail below. Backbone 50 is known in the art and includes a body 53 extending axially from a forward end 54 to an aft end 56. Backbone body 53 includes a forward attachment point 60, a center attachment point 62, and an aft attachment point 64. Center attachment point 62 is located axially between forward attachment point 60 and aft attachment point 64, and is identical to forward attachment point 60. Forward and center attachment points 60 and 62, respectively, each include a shelf (not shown in FIGS. 2 and 3) used to frictionally secure backbone 50 to attachment assembly 52. More specifically, the shelf extends radially inward from a sidewall 65 into an opening 66 defined by sidewall 65.

Backbone body aft attachment point 64 includes a pair of sidewalls 68 that define a channel 70. An opening 72 extends through sidewalls 68 and is sized to receive a fastener (not shown) for securing backbone 50 radially to attachment assembly 52.

Attachment assembly 52 includes a plurality of clamp sub-assemblies 80 and a base sheet 82. More specifically, attachment assembly 52 includes a forward clamp sub-assembly 84, an aft clamp sub-assembly 86, and a center clamp sub-assembly 88 between aft clamp sub-assembly 86 and forward clamp sub-assembly 84. Each clamp sub-assembly 80 includes a first washer 90 and a second washer 92. Each washer 90 and 92 includes a center opening 94 and 96, respectively. Each washer opening 94 and 96 has a diameter 98. First washer 90 is a shim washer and is between second washer 92 and base sheet 82. Second washer 92 is a belleville washer and has a thickness 100.

Center clamp sub-assembly 88 is identical with forward clamp sub-assembly 84 and each includes a retainer 104 and a hanger 106. Each retainer 104 includes a body portion 110, a retaining hook portion 112, and a base 113. Retainer body portion 110 extends substantially perpendicularly from base 113 and is substantially U-shaped, such that a channel 116 is defined between a pair of sidewalls 118. Body portion sidewalls 118 include a pair of openings 120 sized to receive a pair of fasteners 122 therethrough. In one embodiment, fasteners 122 are threaded.

Retainer base 113 has a diameter 126 that is larger than washer opening diameter 98 and smaller than an outer diameter 128 of washers 90 and 92. Accordingly when clamp sub-assemblies 84 and 88 are assembled, retainer base 113 is concentrically aligned with and compressed against washer 92 such that a seal is formed between retainer 104 and washer 92.

Retainer hook portion 112 projects outward a distance 130 from a radially outer surface 136 of retainer body portion 110. As such, hook portion 112 has a height 132 that is less than a height 134 of body portion 110. Furthermore, only a radially inner surface 136 of hook portion 112 is substantially coplanar with a radially inner surface 138 of body portion 110.

Hangers 106 are used with center and forward clamp sub-assemblies 88 and 84, respectively. Each hanger 106 includes a base 140 and a post portion 142. Post portion 142 extends substantially perpendicularly from base 140 and includes a pair of openings 144 sized to receive fasteners 122.

Hanger base 140 is substantially circular and has a diameter 150 and a thickness 152 measured between a radially inward surface 154 and a radially outer surface 156. A first annular projection 158 extends radially inward from an annular ring 159 to hanger post portion 142. More specifically, annular ring 159 tapers between annular projection 158 and hanger base 140. Annular projection 158 has a substantially elliptical cross-sectional profile and is aligned concentrically with respect to base 140. Furthermore, annular projection 158 has a maximum diameter (not shown) that is less than base diameter 150.

Hanger post portion 142 extends from hanger base annular projection 158 and has a width 160 that is wider than a width (not shown) of annular projection 158. Accordingly, a notch 162 is defined between hanger post portion 142 and hanger base annular projection 158.

Aft clamp sub-assembly 86 is substantially similar to forward and center clamp sub-assemblies 84 and 88, respectively, and each includes an annular ring retainer 170 and a hanger 172. Ring retainer 170 defines an opening 174 and includes a pair of a locking tabs 176. Ring retainer opening 174 has a substantially elliptical cross-sectional profile that defines a maximum diameter (not shown).

Aft clamp sub-assembly retainer tabs 176 ensure retainer 170 is secured in proper alignment with respect to clamping subs assembly 86 and backbone 50. More specifically tabs extend substantially perpendicularly from ring retainer 170, and are spaced a distance 178 apart. Tab distance 178 is slightly larger than a distance 180 measured between an outer surface 182 of each backbone body aft attachment point sidewalls 68.

Ring retainer 170 has an outer diameter 186 that is larger than washer opening diameter 98 and smaller than an outer diameter 128 of washers 90 and 92. Accordingly when clamp sub-assembly 86 is assembled, ring retainer 170 is concentrically aligned with and compressed against washer 92 such that a seal is formed between ring retainer 170 and washer 92.

Aft clamp sub-assembly hanger 172 is substantially similar to forward and center clamp sub-assembly hangers 106, and includes a base 190 and a post portion 192. Post portion 192 extends substantially perpendicularly from base 190 and includes an opening 194 sized to receive the fastener extending through backbone body aft attachment point 64.

Aft clamp sub-assembly hanger base 190 is substantially circular and has a diameter 196 and a thickness 198 measured between a radially inward surface 200 and a radially outer surface 202. A first annular projection 204 extends radially inward from an annular ring 206 to a second annular projection 210. More specifically, annular ring 206 tapers between first annular projection 204 and hanger base 190. First annular projection 204 has a substantially elliptical cross-sectional profile and is aligned concentrically with respect to base 190. Furthermore, first annular projection 204 has a maximum diameter (not shown) that is smaller than base diameter 196.

Second annular projection 210 extends from first annular projection 204 to a base 212 of hanger post portion 142. Hanger post portion base 212 has a substantially circular cross-sectional profile and a diameter (not shown) that is smaller than a shortest diameter of aft clamp sub-assembly ring retainer opening 174.

Attachment assembly base sheet 82 is fabricated from a non-metallic material and includes an axis of symmetry 220 extending axially from a first side 222 of base sheet 82 to a second side 224 of base sheet 82. In one embodiment, base sheet 82 is fabricated from a ceramic matrix composite material that facilitates extending a useful life of base sheet 82 during high temperature operations. Base sheet 82 includes a plurality of openings 226 co-axially positioned with respect to axis of symmetry 220. More specifically, base sheet 82 includes a forward opening 228, a center opening 229, and an aft opening 230.

Each opening 226 is defined with a raised surface 232 extending radially inward from a radially inward surface 234 of base sheet 82. Raised surface 232 has an outer diameter 234 larger than washer outer diameter 128. Openings 226 have substantially elliptically-shaped cross-sectional profiles, and are arranged such that a maximum diameter (not shown) of each opening 226 is substantially perpendicular to base sheet axis of symmetry 220.

Openings 226 are sized to receive hanger first projections 158 and 204. More specifically, openings 226 are tapered such that each clamp sub-assembly first projection 158 and 204 and each clamp sub-assembly annular ring 160 and 206, respectively, are received within each opening 226 in close tolerance, such that a seal is formed between each hanger 96 and 172, respectively, and base sheet 82.

Base sheet 82 also includes a recessed portion (not shown in FIGS. 2 and 3) extending inward from base sheet flow side 42 circumferentially around each base sheet opening 226. Each base sheet recessed portion is sized to receive each clamp sub-assembly hanger base 140 and 190, such that after each clamp sub-assembly 80 is assembled, each hanger base 140 and 190 is received within each respective recessed portion, such that each hanger radially outer surface 156 and 202, respectively is substantially co-planar with base sheet flow side 42.

During assembly of seal system 40, clamp sub-assemblies 80 are assembled and secured to base sheet 82. Initially, forward and center sub-assembly hangers 96 are inserted through respective base sheet openings 228 and 229, such that hanger base 140 is received within the forward and center base sheet recessed portions. Because base sheet openings 226 are elliptical, openings 226 ensure hangers 96 are secured to base sheet 82 in proper alignment relative to base sheet 82.

First washer 90 is inserted over each hanger post portion 142 and placed in contact with base sheet raised surface 228. Second washer 92 is then inserted over each hanger post portion 142, such that each second washer 92 is in contact with each first washer 90. More specifically, when each second washer 92 is in position, each second washer will be compressed and received within each respective hanger notch 162, such that a seal is formed between each washer 92 and each hanger annular projection 158.

Each retainer 104 is then inserted over each hanger 106. More specifically, each retainer 104 is inserted over each hanger 106, such that each hanger post portion 142 is received within each respective retainer channel 116. Retainers 104 are then forced towards base sheet 82 to concentrically align retainer sidewall openings 120 with hanger post portion openings 144. Fasteners 122 are then used to secure each retainer 104 to each hanger 106, such that each washer 92 supplies a pre-determined amount of preload force to base sheet 82. The amount of preload supplied to base sheet 82 with washers 92 is variable and dependant upon a thickness 100 of washer 92 selected. In another embodiment, preload is dependant upon a thickness (240) of each washer 90. Washer preload is preselected to prevent seal chatter within seal system 40 during all gas turbine engine operational temperature and pressure combinations.

Aft sub-assembly hanger 172 is then inserted through base sheet aft opening 230, such that aft sub-assembly hanger base 190 is received within the aft base sheet recessed portion. Because base sheet aft opening 230 is elliptical, opening 230 ensures aft sub-assembly hanger 172 is secured to base sheet 82 in proper alignment relative to base sheet 82.

First washer 90 is inserted over hanger post portion 192 and placed in contact with base sheet raised surface 228. Second washer 92 is then inserted over hanger post portion 192, such that each second washer 92 is in contact with each first washer 90.

Aft clamp sub-assembly ring retainer 170 is then inserted over hanger post portion 192. More specifically, because ring retainer opening 174 is elliptical, to receive hanger post portion 192, ring retainer 170 is rotated initially inserted over hanger post portion 192, such that the ring retainer maximum diameter is aligned substantially parallel with base sheet centerline axis of symmetry 220. Ring retainer 170 is then forced towards base sheet 82 to compress washers 90 and 92, such that a seal is formed between washers 90 and 92, and base sheet 82. When washers 90 and 92 are sufficiently compressed, ring retainer 170 is rotated ninety degrees, such that ring retainer tabs 176 are parallel base sheet second side 224.

After ring retainer 170 is rotated, hanger post portion 192 prevents ring retainer 170 from rotating, thus maintaining compression on washers 90 and 92. More specifically, each washer 90 and 92 supplies a pre-determined amount of preload force to base sheet 82. The amount of preload supplied to base sheet 82 with washers 92 is variable and dependant upon a thickness 100 of washer 92 selected. In another embodiment, preload is dependant upon a thickness 240 of each washer 90. Washer preload is preselected to prevent seal chatter within seal system 40 during all gas turbine engine operational temperature and pressure combinations.

Attachment assembly 52 is then coupled to backbone 50. More specifically, forward and center clamp sub-assembly retainers 104 are received within respective backbone attachment points 60 and 62. More specifically, retainers 104 are received within backbone attachment point openings 66. Additionally, aft clamp sub-assembly hanger post portion 192 is received within backbone aft attachment point channel 70. Attachment assembly 52 is then slid forward such that forward and center clamp sub-assembly retainer hook portions 112 frictionally engage the backbone attachment points shelf, and such that aft clamp sub-assembly hanger post portion opening 194 is concentrically aligned with backbone aft attachment point openings 72. A fastener is then used to secure backbone 50 to attachment assembly 52. Hook portions 112 guide and center attachment assembly 52 with respect to backbone 50.

During engine operation, hook portions 112 and aft clamp sub-assembly hanger post portion opening 194 transfer downward seal loading to backbone 50. As seal system 40 is exposed to high temperatures, hook portions 112 and the aft fastener permit attachment assembly 52 to thermally expand without breaching sealing between base sheet 82 and clamp sub-assemblies 80. As a result, attachment assembly 52 facilitates thermal growth differences between metal components and base sheet 82. Furthermore, clamp sub-assemblies provide a margin for thermal and mechanical misalignments to facilitate eliminating local stress risers in attachment point regions, thus reducing tensile stress at base sheet openings 226 via compressive preloading.

Figure 4:
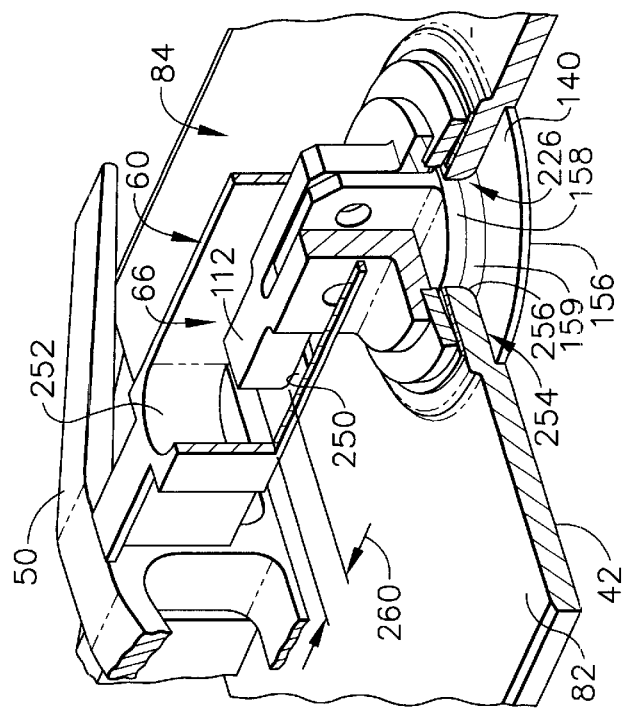
FIG. 4 is an enlarged partially cut-away view of the seal system shown in FIG. 2 taken along area 4.

FIG. 4 is an enlarged partially cut-away view of an assembled forward clamp assembly 84 coupled to backbone 50. Backbone body forward attachment point 60 includes a shelf 250 extending axially into attachment point opening 66. More specifically, shelf 250 extends from a forward end 252 of opening 66.

Attachment assembly base sheet 82 includes a recessed portion 254 circumferentially surrounding each base sheet opening 226. More specifically, each base sheet recessed portion 254 extends inward from base sheet flow side 42 to a tapered sidewall 256 defining opening 226. Accordingly, when hanger base 140 is received within opening 226, hanger base radially outer surface 156 is substantially co-planar with base sheet flow side 42. Additionally, when hanger base 140 is received, tapered sidewall 256 ensures sealing contact between hanger first projection 158 and annular ring 160 is maintained with base sheet 82, as well as sealing contact between hanger base 140 and base sheet 82.

Furthermore, as shown in FIG. 4, when retainer hook portion 112 frictionally engages backbone attachment point shelf 250, retainer hook portion 112 is a distance 260 from backbone attachment point opening sidewall 65. Distance 260 permits attachment assembly 52 to thermally expand.

Figure 5:
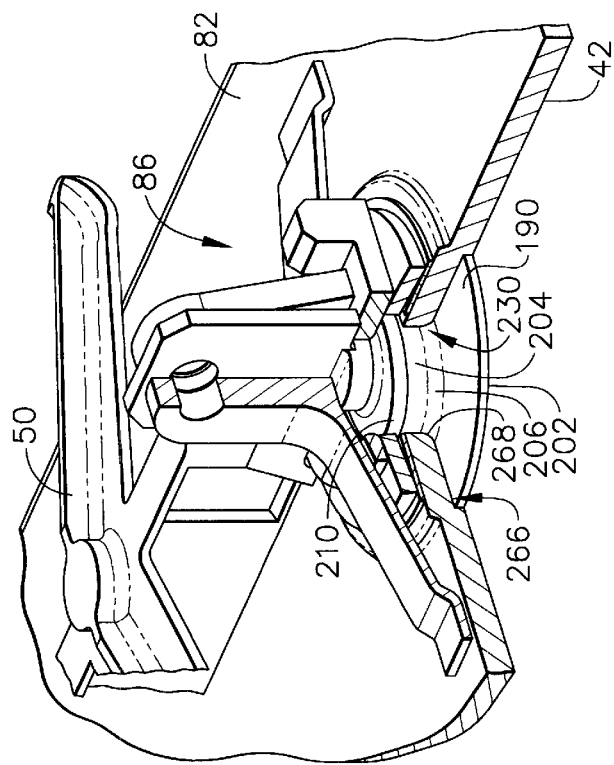
FIG. 5 is an enlarged partially cut-away view of the seal system shown in FIG. 2 taken along area 5.

FIG. 5 is an enlarged partially cut-away view of an assembled aft clamp assembly 86 coupled to backbone 50.

Attachment assembly base sheet 82 includes a recessed portion 266 circumferentially surrounding base sheet aft opening 230. More specifically, base sheet recessed portion 266 extends inward from base sheet flow side 42 to a tapered sidewall 268 defining opening 230. Accordingly, when hanger base 190 is received within opening 230, hanger base radially outer surface 202 is substantially co-planar with base sheet flow side 42. Additionally, when hanger base 190 is received, tapered sidewall 266 ensures sealing contact between hanger first projection 204, second projection 210, and annular ring 206 is maintained with base sheet 82, as well as sealing contact between hanger base 190 and base sheet 82.

Furthermore, backbone aft attachment point 64 secures attachment assembly 52 to backbone 50 such that attachment assembly 52 may thermally expand axially, and such that attachment assembly 52 is prevented from shifting laterally side-to-side.

The above-described seal system is cost-effective and highly reliable. The seal system includes an attachment assembly including a base sheet fabricated from a ceramic matrix composite material. Because the clamp sub-assemblies apply a predetermined preload to the base sheet, stress concentrations inherent with bolted and riveted attachments are eliminated, and thermal growth between the non-metallic base sheet and the seal system metal components is accommodated. Furthermore, the clamp assemblies facilitate eliminating local stress concentrations within the base sheet, thus reducing tensile stress at the base sheet openings. As a result, the attachment assembly facilitates extending a useful life of the gas turbine engine variable geometry seal system in a cost-effective and reliable manner.

While the invention has been described in terms of various specific embodiments, those skilled in the art will recognize that the invention can be practiced with modification within the spirit and scope of the claims.

What is claimed is:

1. A method for assembling a seal system for gas turbine engine exhaust nozzle, the seal system including an attachment assembly and a backbone, the attachment assembly including a non-metallic base sheet and a plurality of clamp sub-assemblies, the base sheet including a plurality of openings, said method comprising the steps of:

inserting a clamp sub-assembly through each non-metallic base sheet opening; and frictionally engaging the backbone with the clamp sub-assemblies such that the attachment sub-assembly is secured to the backbone.

2. A method in accordance with claim 1 wherein each of the clamp sub-assemblies includes at least one washer, a hanger, and a retainer, said step of frictionally engaging the backbone further comprising the steps of:

securing the base sheet and the washer to the hanger with the retainer; and aligning the retainer with respect to the base sheet and the washer with the hanger.

3. A method in accordance with claim 2 wherein said step of securing the base sheet further comprises the step of securing the base sheet between the washer and the hanger.

4. A method in accordance with claim 2 wherein said step of frictionally engaging the backbone further comprises the step of applying a preload to the base sheet as the attachment sub-assembly is secured to the backbone.

5. A method in accordance with claim 4 wherein said step of applying a preload to the base sheet further comprises the step of selecting a washer to deliver a pre-determined amount of preload force to the base sheet.

6. A seal assembly for a gas turbine engine exhaust nozzle, said seal assembly comprising:

a backbone; and an attachment sub-assembly comprising a base sheet and a plurality of clamp sub-assemblies, at least one of said clamp sub-assemblies configured to frictionally engage said backbone to secure said attachment sub-assembly to said backbone such that said base sheet is secured against said clamp sub-assemblies with a preload force, said base sheet fabricated from a non-metallic material.

7. A seal assembly in accordance with claim 6 wherein each of said clamp sub-assemblies comprise at least one washer, a hanger, and a retainer, said retainer configured to secure said base sheet and said washer to said hanger.

8. A seal assembly in accordance with claim 7 wherein each said hanger configured to maintain said retainer in alignment with respect to said base sheet and said washer.

9. A seal assembly in accordance with claim 7 wherein said base sheet between each said washer and each said hanger.

10. A seal assembly in accordance with claim 6 wherein said washers selected to deliver a pre-determined amount of preload force to said base sheet.

11. A seal assembly in accordance with claim 6 wherein said base sheet fabricated from a ceramic matrix composite material.

12. A seal assembly in accordance with claim 6 wherein said base sheet comprises a plurality of openings sized to receive said clamp sub-assemblies therethrough.

13. A seal assembly in accordance with claim 12 wherein said base sheet openings configured to orient said clamp sub-assemblies relative to said base sheet.

14. A gas turbine engine comprising a variable engine exhaust nozzle comprising a seal system coupled to said engine exhaust nozzle, said seal system comprising an attachment assembly and a backbone, said attachment assembly comprising a base sheet fabricated from a non-metallic material, and a plurality of clamp sub-assemblies, at least one of said clamp sub-assemblies configured to frictionally engage said backbone to secure said attachment sub-assembly to said backbone such that said base sheet is secured against said clamp sub-assemblies with a preload force.

15. A gas turbine engine in accordance with claim 14 wherein said attachment assembly base sheet fabricated from a ceramic matrix composite material.

16. A gas turbine engine in accordance with claim 15 wherein each said clamp sub-assembly comprises at least one washer, a hanger, and a retainer, said retainer configured to secure said base sheet and said washer to said hanger, said hanger configured to maintain said retainer in alignment with respect to said base sheet and said washer.

17. A gas turbine engine in accordance with claim 15 wherein said base sheet comprises a plurality of openings sized to receive said clamp sub-assemblies therethrough.

18. A gas turbine engine in accordance with claim 17 wherein said base sheet openings configured to orient said clamp sub-assemblies relative to said base sheet.

19. A gas turbine engine in accordance with claim 17 wherein said base sheet between each said washer and each said hanger.

20. A gas turbine engine in accordance with claim 17 wherein said washers selected to deliver a pre-determined amount of preload force to said base sheet.

* * * * *